UNITED STATES PATENT OFFICE.

CHARLES B. HEADLY, OF PHILADELPHIA, PENNSYLVANIA.

FRAME FOR EYEGLASSES AND SPECTACLES.

SPECIFICATION forming part of Letters Patent No. 318,734, dated May 26, 1885.

Application filed May 5, 1884. (No specimens.)

*To all whom it may concern:*

Be it known that I, CHARLES B. HEADLY, of the city and county of Philadelphia, and State of Pennsylvania, have invented a new and useful Improvement in Frames for Eyeglasses and Spectacles, of which the following is a specification.

The object of my invention is to produce a spectacle or eyeglass frame the outer surface of which is of gold and the inner substance of which is an alloy formed of copper and tin and possessing the color, the elasticity, and about the same non-oxidizable quality as gold of fourteen carats fineness, and at a much less cost than would be possible in case the article named were manufactured from gold alone. The alloy employed by me in the manufacture of said frame is composed of substantially one hundred parts of copper and twelve parts of tin, and is made by melting them together, or by melting them separately and afterward mixing them together. This alloy I have discovered possesses the color, the elasticity, and to a large extent the non-oxidizable characteristic of gold of about fourteen carats fineness. The application of gold to the outer surface of this alloy may be accomplished by electro-deposition, or, if desired, by the ordinary process of applying sheets of gold to sheets of base-metal by soldering and rolling, and then bending said sheet or strip of gold-surfaced alloy into the form of a cylinder or tube, soldering the edges together, and drawing said gold-surfaced tube through dies to produce a gold-surfaced rod or wire of the desired size. The manipulation or working of these rods or wires into frames for spectacles and eyeglasses may be accomplished in any convenient manner. I do not, however, limit myself to any specific means for providing said alloy with a surface of gold, or to any specific means of manipulating said gold-surfaced alloy to form it into an eyeglass or spectacle frame.

I am aware that gold-surfaced alloys have heretofore been made and used in the arts; but in all such cases they have been open to one or more of the following objections, viz: that the alloy was not the same in color as gold, or that it did not sufficiently possess its non-oxidizable characteristic, and therefore became visible and easily tarnished in case of the wearing off of the outer surfaces of gold, and the further objection that said alloy did not possess the degree of elasticity of gold, with the result that the article manufactured therefrom was not elastic to the extent desired.

My invention possesses the following advantages, viz: that the elasticity of the spectacle or eyeglass frame is as great as though gold alone had been used in its manufacture, the elasticity of the alloy employed being the same as that of the gold employed with it, and in the case of the wearing off of the outer surface of gold the non-oxidizable surface of the same color as gold is presented.

Having thus described my invention, I claim—

As a new article of manufacture, a spectacle or eyeglass frame the outer surface of which is of gold and the inner substance of copper and tin alloyed in the proportions substantially as specified.

In testimony whereof I have hereunto signed my name this 2d day of May, A. D. 1884.

CHARLES B. HEADLY.

In presence of—
W. C. STRAWBRIDGE,
J. BONSALL TAYLOR.